United States Patent [19]
Chang

[11] Patent Number: 5,975,105
[45] Date of Patent: Nov. 2, 1999

[54] SEISMIC ACTIVATED ACTUATOR

[76] Inventor: Albert Chang, P.O. Box 70461, Point Richmond, Calif. 94807-0461

[21] Appl. No.: 09/062,793

[22] Filed: Apr. 20, 1998

[51] Int. Cl.[6] .................................................... F16K 17/36
[52] U.S. Cl. ............................................... 137/45; 137/38
[58] Field of Search ................................... 137/38, 45, 46

[56] References Cited

U.S. PATENT DOCUMENTS

| | | | |
|---|---|---|---|
| 4,353,383 | 10/1982 | Kiesel | 137/45 |
| 4,960,147 | 10/1990 | Diamond | 137/45 |
| 5,325,881 | 7/1994 | Hunter et al. | 137/43 X |
| 5,482,074 | 1/1996 | Hanson | 137/45 |

FOREIGN PATENT DOCUMENTS

| 56-73285 | 6/1981 | Japan | 137/45 |
|---|---|---|---|

*Primary Examiner*—Gerald A. Michalsky
*Attorney, Agent, or Firm*—Fleisler, Dubb, Meyer & Lovejoy LLP

[57] ABSTRACT

A seismic actuator for initiating various actions and/or changes to a system in response to seismic activity above a predetermined threshold level. In an embodiment of the invention, the actuator comprises a seismic valve for shutting off gas flow through a pipe upon seismic activity above a predetermined threshold level, and for resetting the valve to reestablish gas flow through the pipe. The seismic valve according to embodiments of the present invention may be seated within a pipe in any orientation. The valve includes a stopper capable of alternatively allowing and blocking gas flow, a locking ball capable of restraining the stopper in a position allowing gas flow, and a plunger for securing the locking ball in a location where the ball restrains the stopper in the position allowing gas flow. The valve further includes a pendulum adjacent to the plunger. During seismic activity, the pendulum swings, thereby moving the plunger to a location where the locking ball does not restrain the stopper in the position allowing gas flow. When not restrained by the locking ball, the stopper moves to the position blocking gas flow. Embodiments of the valve further include a system for manually resetting of the valve without opening the valve or pipe.

7 Claims, 9 Drawing Sheets

SEISMIC ACTIVATED ACTUATOR

BACKGROUND OF THE INVENTION

1. Field of the Invention

The present invention relates to a seismic actuator, and in particular to a device capable of initiating various actions and/or changes to a system in response to seismic activity above a predetermined threshold level.

2. Description of Related Art

A significant source of damage during earthquakes are fires caused by the rapture of natural gas lines due to the seismic activity. Natural gas is widely used in residential homes for heating and cooking due to its convenience, cleanliness and efficiency. However, natural gas is highly flammable and fires resulting from gas escaping a ruptured gas line during an earthquake can often cause more damage than the seismic shockwaves themselves.

In order to prevent fires from ruptured gas lines during an earthquake, several devices have been developed for automatically shutting off the flow of gas within a gas line upon seismic activity above a threshold level. For example, U.S. Pat. No. 4,960,147 to Diamond discloses a shock-activated valve including a valve assembly and a pendulum and ball detent assembly. The valve assembly includes a handle biased via a spring from an open position where gas is allowed to flow to a closed position where gas flow is shut off. The handle is held in the open position by engagement with a ball protruding out of the top of the pendulum and ball detent assembly. The ball is held in engagement with the handle by resting on top of an upper portion of a pendulum. During seismic activity, the pendulum swings thereby allowing the ball to drop within the assembly. Once the ball disengages from the handle, the handle is free to swing to the closed position to shut off gas flow.

Another example of a seismic valve is disclosed in U.S. Pat. No. 4,860,780 to Fisher, which shows a pendulum having a trigger portion with a flat upper surface normally parallel to a lower surface of an activator. During seismic activity, the pendulum swings thereby causing the flat upper surface of the trigger to raise up, contact, and lift the activator. The activator normally holds a control lever in an open position. Upon the activator being raised, the control lever is free to swing closed due to the biasing force of a spring, to thereby shut off gas flow.

U.S. Pat. No. 4,131,124 to Sunde discloses a disk mounted on a stem within a gas flow tube. The disk is biased via a spring into a position over a port which would block gas flow. The disk and stem are held in an open position via a pivoting rod. Upon seismic activity, the pivoting rod pivots, thereby freeing the stem and disk to move downward over the port to shut off gas flow.

U.S. Pat. No. 5,482,074 to Hanson discloses a spool member within a gas flow line. The spool member is biased via a spring into a position blocking gas flow, but is held in an open position via a trigger assembly. Upon seismic activity, a pendulum oscillates such that a flange of the pendulum engages the trigger assembly to move the trigger assembly downward, thus freeing the spool member to move to a position to shut off gas flow.

U.S. Pat. No. 3,890,993 to MacNeilage discloses a pendulum having an upper end including a recess which engages an arm. The arm is biased into a position which would shut off gas flow, but is held in an open position by the recess in the upper end of the pendulum. Upon seismic activity, the recess disengages from the arm so that the arm swings to the position where gas flow is shut off.

Several other patents disclose gravity-based shut off valves where a ball covers a valve, or otherwise causes a valve to close, upon the ball being unseated from its support position by seismic activity, and falling to a lower potential energy state. See, for example, U.S. Pat. No. 4,091,831 to Pazmany; U.S. Pat. No. 4,885,832 to Plemmons et al.; and U.S. Pat. No. 5,209,252 to Perle. Still other patents disclose seismic valves including magnetically held objects, which objects fall into a position blocking gas flow upon the object being shaken loose from the magnet due to seismic activity. See, for example, U.S. Pat. No. 4,817,657 to Kovacs and U.S. Pat. No. 5,240,025 to Morris.

Some references further disclose a reset mechanism for resetting the valve after the valve moves to a position blocking gas flow. See, for example, U.S. Pat. No. 4,485,832 to Plemmons et al.; U.S. Pat. No. 5,209,252 to Perle; and U.S. Pat. No. 4,799,505 to Nowell.

SUMMARY OF THE INVENTION

It is therefore an advantage of the present invention to provide a seismic actuator for initiating an action and/or changing a system in response to seismic activity above a predetermined threshold level.

It is another advantage of the present invention to provide an improved device for shutting off gas flow through a gas line upon seismic activity above a predetermined threshold level.

It is a further advantage of the present invention to provide a seismic actuator for initiating an action and/or changing a system in response to seismic activity above a predetermined threshold level which will operate to prevent the flow of gas, regardless of a shifting of its position due to the seismic activity.

It is another advantage of the present invention to provide an improved system for allowing a seismic valve to be reset after the valve has shut off to prevent gas flow.

These and other advantages are accomplished by the present invention which relates to a seismic actuator capable of initiating various actions and/or changes to a system in response to seismic activity above a predetermined threshold level. In a preferred embodiment, the seismic actuator comprises a valve located within a gas line for shutting down the flow of gas upon seismic activity. In embodiments of the invention, the gas valve may be easily reset to reestablish gas flow through the pipe once the seismic activity has subsided.

The valve includes a stopper releasably attached to the body of the valve, such that the stopper allows gas flow through the pipe when the stopper is attached to the valve body, and the stopper blocks gas flow through the pipe upon being released from the valve body upon seismic activity. When the valve is in an open state, the stopper is locked onto the valve body by means of a "locking ball" which engages and holds an edge surface of the stopper. The device further includes a plunger which engages the locking ball and forces the locking ball against the edge of the stopper wall when the valve is in an open state. The plunger additionally includes a groove provided around its circumference at a location along its length such that the plunger groove is normally below, and not radially aligned with, the locking ball.

The valve further includes a pendulum supported in the valve within a pendulum base, such that the pendulum is capable of shaking and swinging within the pendulum base as a result of seismic activity. A first flange is attached to the bottom of the plunger, and a second flange is attached to a top portion of the pendulum. The first flange is not joined to the second flange, but the flanges have planar surfaces that are substantially parallel to each other and perpendicular to a central axis through the valve. In the absence of seismic activity, the planar surfaces of the first and second flanges lie slightly spaced from or in contact with each other. The weight of the plunger maintains the first flange adjacent to or in contact with the second flange. For seismic shock above a predetermined level, the pendulum and first flange will swing. The pivoting of the first flange will push the second flange and plunger upward. The upward movement of the plunger will align the plunger groove with the locking ball. At this point, the ball will move out of the groove in the stopper and into the groove in the plunger. The stopper is spring biased away from the body of the valve, and once the locking ball disengages from the stopper, the stopper will shoot away from the body of the valve, and into a seat in the gas line, thereby blocking gas flow through the pipe.

In an alternative embodiment, a carrier of the valve includes an upper surface located on an exterior of the gas pipe, which upper surface includes a groove for receiving a screwdriver or other similar device capable of rotating the carrier. In order to reset the valve into an open state, the carrier is rotated, which in turn moves the valve body downward in the direction of the disengaged stopper. At some point during the downward movement of the valve body, the locking ball will once again align with the groove in the stopper. The plunger is spring biased upward with respect to the locking ball. Therefore, upon the locking ball once again aligning with the groove in the stopper, the locking ball will disengage from the groove in the plunger and will seat in the groove in the stopper. Once the locking ball is disengaged from the plunger groove, the plunger moves upward such that the plunger body once again locks the locking ball in the plunger groove. Thereupon, when the rotation of the carrier is reversed, the valve body moves upward, and carries the stopper therewith to once again allow gas flow through the pipe.

BRIEF DESCRIPTION OF THE DRAWINGS

The present invention will now be described with reference to the drawings in which.

DETAILED DESCRIPTION

The present invention will now be described with reference to FIGS. 1–9 which in general disclose a device for initiating various actions and/or changes to a system upon seismic activity above a predetermined threshold level. In a preferred embodiment, the device is a seismic valve capable of shutting off gas flow within a gas line in the event of seismic activity. However, as set forth below, it is contemplated that the present invention be used to initiate various actions and/or change the state of various systems, such as for example turning on or off an electrical circuit, or actuating any of various mechanical operations. Additionally, although the present invention is primarily intended for use in residential homes, it is understood that the present invention may also have industrial applications.

Figure 1:
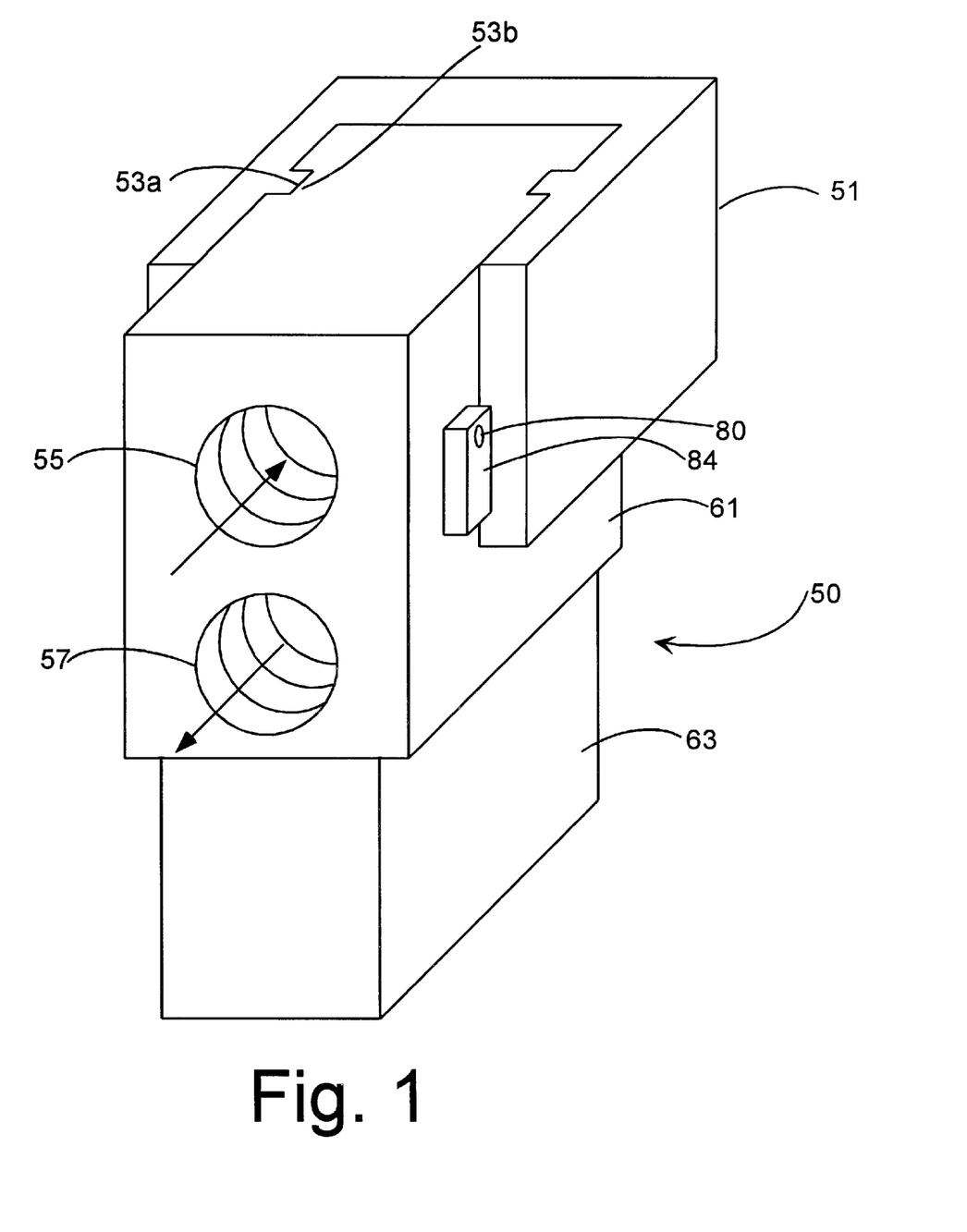
FIG. 1 is a perspective exterior view of the seismic actuator according to the present invention.

Referring now to FIGS. 1–4D, an embodiment of the present invention where the seismic actuator comprises a seismic valve for shutting off gas flow in the event of seismic activity above a predetermined threshold level. FIG. 1 shows an exterior view of the seismic valve 50 mounted to a bracket 51. The bracket 51 may be mounted in position, as in a wall, by convention fastening means such as screws or bolts. The bracket preferably includes a male or female groove 53a for receiving a corresponding female or male groove 53b in the seismic valve. The grooves allow the valve 50 to be slid within the bracket 51, and fastened at a desired relative to the bracket. The valve 50 may be fastened to the bracket with known fasteners, preferably allowing for adjustment of the valve relative to the bracket. It is understood that the bracket 51 may have other configurations for affixing the valve 50 in position.

After the valve 50 is mounted to the bracket 51, gas pipelines may be secured within holes 55 and 57. Thus, gas may flow through the valve as indicated by the arrows in FIG. 1 when the valve is in an open position as explained hereinafter.

Figure 2:
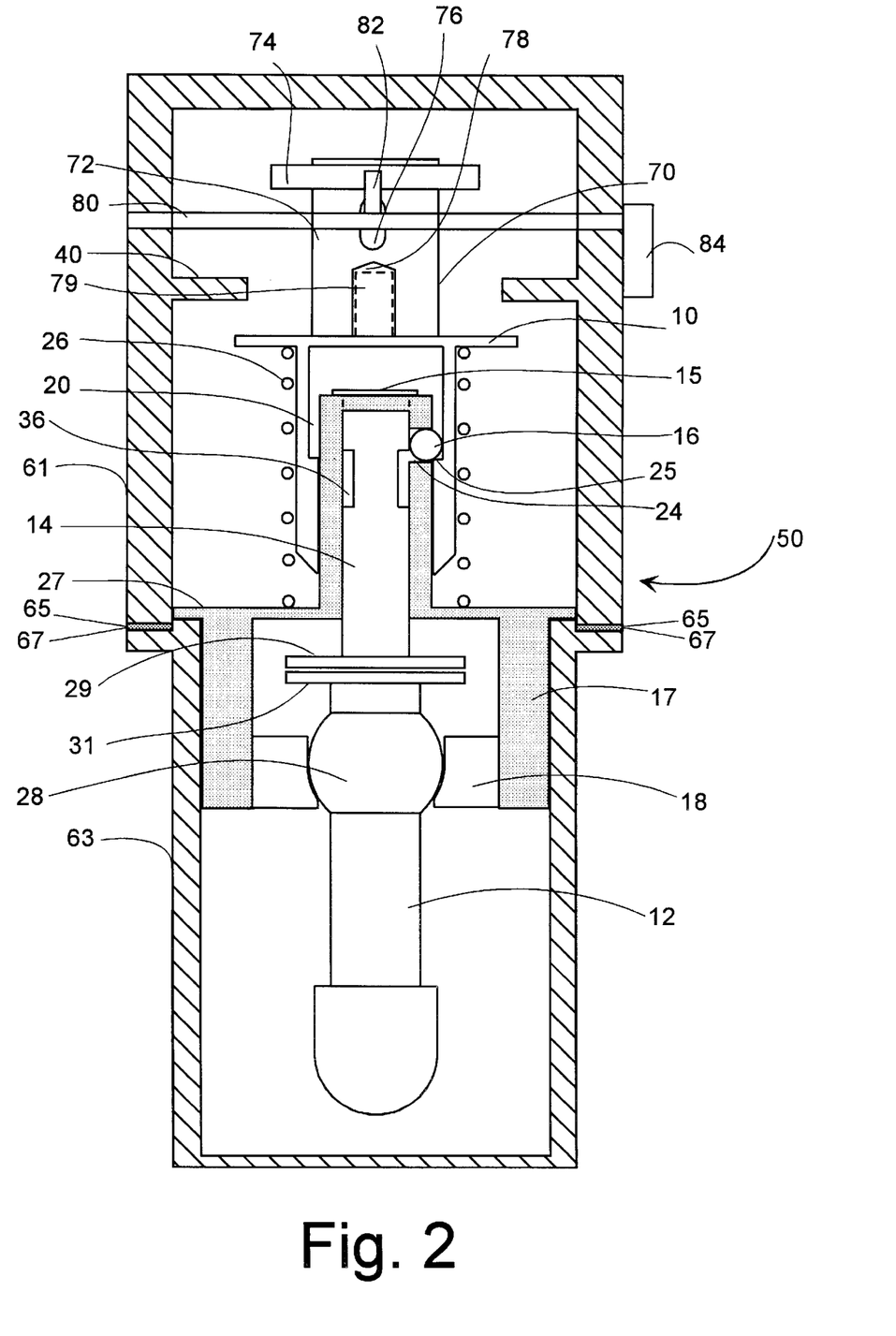
FIG. 2 is a front interior view of a seismic actuator in an open position according to the present invention.

Referring now to FIGS. 1 and 2, the valve includes an outer housing comprised of a valve housing 61 and a pendulum housing 63. The valve housing is affixed to the bracket 51, and the pendulum housing is in turn affixed to the valve housing at a joint 65. It is understood that the pendulum housing may instead be affixed to the bracket, and the valve housing affixed to the pendulum housing, in an alternative embodiment. A heat resistant gasket 67 may be provided between the valve and pendulum housings to ensure an air-tight fit.

FIG. 2 shows the interior components of the valve 50, with the valve in an open position. As used herein, the phrase "open position" or "open state" refers to a position or state of the valve 50 in which gas flows unimpeded through the valve. The valve 50 includes a stopper 10, and a valve body comprised of a pendulum 12, a plunger 14, a locking ball 16, a valve base 17 (shown shaded for clarity), and a pendulum base 18. A valve reset assembly 70 is additionally seated on top of the stopper 10.

When valve 50 is in an open state, the locking ball 16 resides within a hole 24 formed within the wall of valve base 17. The diameter of locking ball 16 is slightly greater than the thickness of the wall of valve base 17, so that a portion of the ball protrudes either into a hollow cavity 20 defined by an inner wall surface of stopper 10 (as shown in FIG. 2), or protrudes radially inward beyond an inner wall surface of valve base 17 (as explained hereinafter). As further shown in FIG. 2, the plunger 14 resides within a central opening through the middle of valve base 17. When the valve is in an open state, the plunger 14 contacts the locking ball 16, and forces the ball 16 to protrude out of the hole 24 and into hollow cavity 20.

The stopper 10 is locked on and circumjacent about the valve base 17 when the valve is in an open state as a result of the locking ball 16 abutting against an edge 25 of stopper 10. A spring 26 is provided around the stopper 10. When the valve is in an open state, the spring is compressed, with a first end supported against a flanged section 27 on the valve base 17, and a second end supported against a surface of the stopper. Thus, the stopper is biased away from the valve body (i.e., upward with respect to the view shown in FIG. 2). As long as the plunger holds locking ball 16 against the edge 25 of the stopper 10, the stopper will remain in position around the valve base 17 and the valve will remain in the open state.

A first flange 29 is attached to the bottom of the plunger 14. A second flange 31 is attached to a top portion of the pendulum 12. The first flange is not joined to the second flange, but the flanges have planar surfaces that are parallel to each other and substantially perpendicular to a central axis through the valve 50. Although not necessary, the flange 29 is held slightly above the flange 31 as a result of a top portion 15 of the plunger 14. A top of the valve base 17 has a hole in it through which the plunger 14 extends. The top portion 15 is wider than the plunger 14 and rests on the top of the valve base, to thereby hold the flange 29 slightly spaced from flange 31. While the top portion 15 prevents the plunger 14 from moving downward any further with respect to the view shown in FIG. 2, the plunger is able to move upward with respect to the valve base as explained below. The weight of the plunger 14 maintains the first flange 29 near to or in contact with the second flange 31.

Each of the above-described members preferably have circular cross-sections and are radially symmetric about a central axis through the middle of the valve 50 (with the exception of locking ball 16 and hole 24). It is understood that the cross-sectional shapes of the abovedescribed components and the abovedescribed dimensions may vary in alternative embodiments of the invention.

Figure 3:
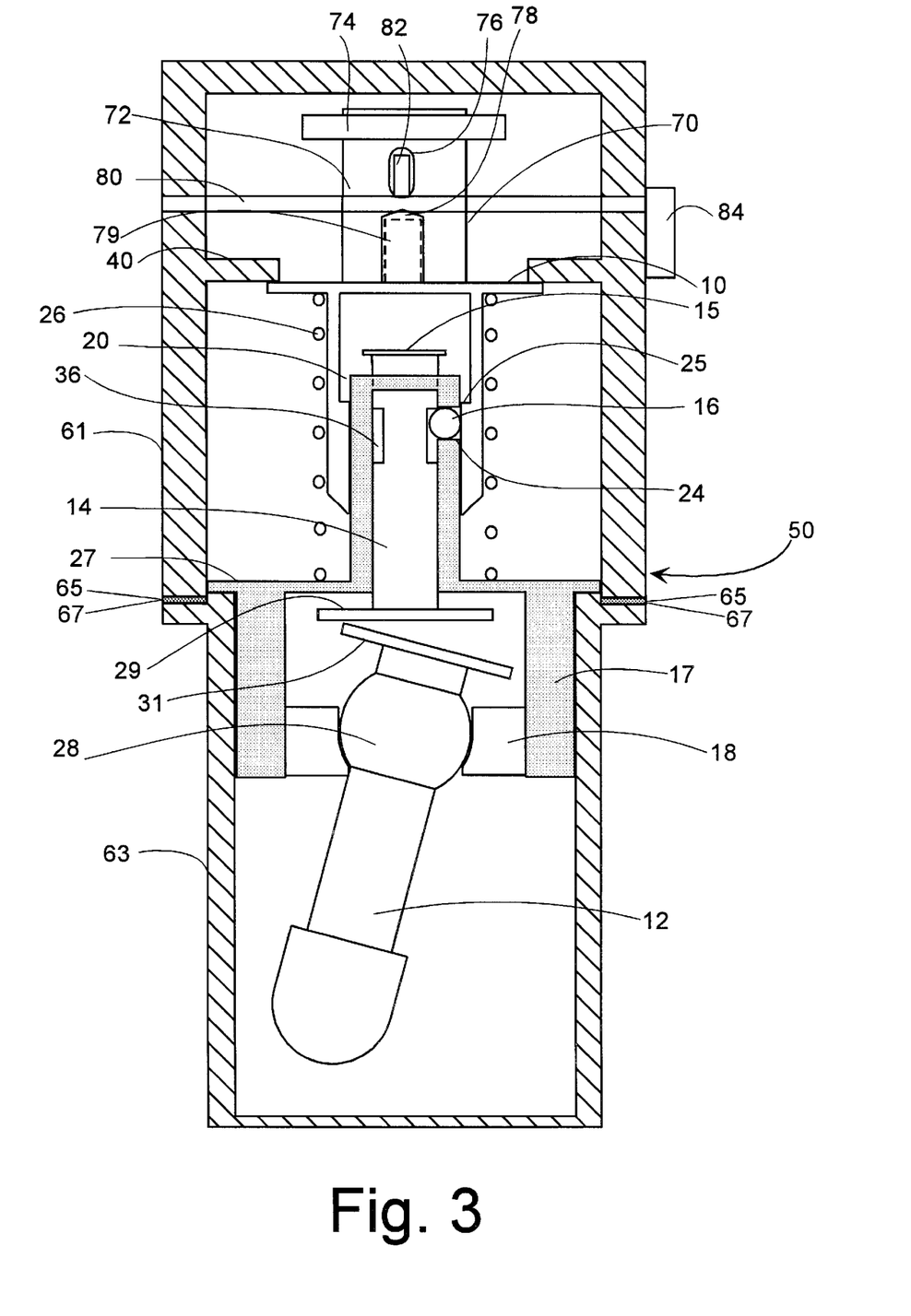
FIG. 3 is a front interior view of a seismic actuator in a closed position according to the present invention.

Referring now to FIGS. 2 and 3, the pendulum 12 includes a ball portion 28 movably secured within an annular pendulum base 18. During an earthquake, seismic activity will exert forces on the valve 50 that cause the pendulum 12 and second flange 31 to swing within the pendulum base 18. As demonstrated in FIG. 3, such swinging causes a central axis of the pendulum to be angled with respect to a central axis of the plunger 14 and valve base 17, which both remain stationary relative to the seat 40. The swinging of the pendulum will occur when any component of force due to the seismic activity acts on the pendulum in a plane perpendicular to a central axis through the middle of the valve 50.

The plunger 14 includes an annular detent 36 around an outer circumference of the plunger. As shown in FIG. 2, the detent is formed along the length of the plunger such that, when the valve is an open state, the detent 36 is not aligned with hole 24 or the locking ball 16. However, as shown in FIG. 3, when the pendulum 12 swings within pendulum base 18, the second flange 31 pivots about a central point of the pendulum base, and an edge of the flange 31 contacts the flange 29, and pushes the flange 29, and plunger 14 attached thereto, upward.

Upon moving upward, the detent 36 of plunger 14 will align with the hole 24 in pendulum 12, thereby allowing the locking ball 16 to move away from edge 25 on the stopper 10, and into the detent 36 in the plunger 14. Once the locking ball 16 moves away from edge 25, the stopper shoots away from the valve body as a result of spring 26, and into contact with a seat 40 formed on the interior of the valve housing 61. When the stopper is in contact with the seat 40, gas is prevented from flowing through the valve 50, and the valve is in a closed state.

The valve reset assembly will now be described with respect to FIGS. 1–4D. The assembly 70 includes a valve follower 72 having a contact block 74 attached at an upper portion, a keyhole 76 formed in an outer surface of the follower 72, and a positioning hole 78 formed in a lower surface of the follower 72. The follower 72 rests on top of the stopper 10, with a positioning shaft 79 fitting within the positioning hole 76. In a preferred embodiment, the positioning shaft 79 and positioning hole 76 have corresponding, non-circular cross-sections to prevent rotation of the follower 72 with respect to the stopper 10. The reset assembly 70 further includes a roll pin 80 extending between and through the walls of the valve housing 61. A key 82 is affixed to a central location of the pin 80, and a reset lever 84 is mounted about the pin 80 on an exterior surface of the housing 61.

Figure 4A:
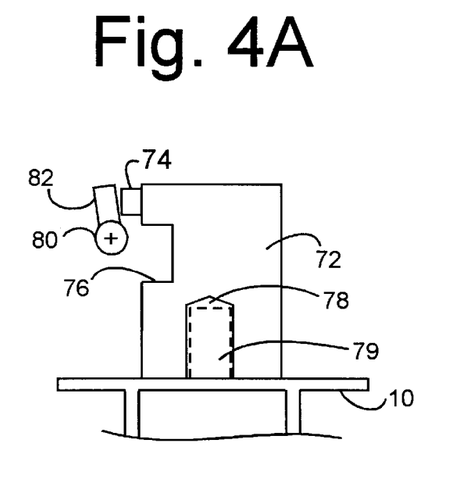
FIG. 4A is a front view of the reset mechanism in a locked position with the seismic actuator in an open position.

When the valve is in an open position, the pin 80, key 82, and lever 84 are substantially prevented from rotating in the clockwise direction (with respect to the views shown in FIGS. 4A–4D) as a result of the key 82 abutting against the block 74 as shown in FIGS. 2 and 4A. Although not critical to the present invention, the key 80, pin 82, and lever 84 may further be prevented from rotating in the counterclockwise direction as a result of the lever 84 abutting against bracket 51 as shown in FIG. 1.

Figure 4B:
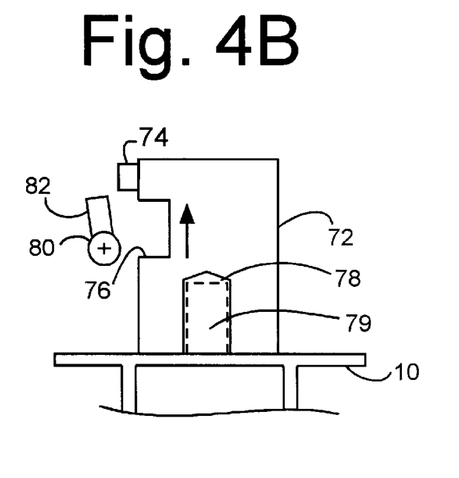
FIG. 4B is a front view of the reset mechanism in an unlocked position with the seismic actuator in a closed position.

Upon seismic activity and a closing of valve 50 as explained above, valve follower 72 will move upward with stopper 10. Pin 80, key 82, and lever 84 remain stationarily mounted in the housing 61, so that upon upward movement of the valve follower 72, the pin 80 and key 82 will occupy a position relative to the valve follower 72 as shown in FIG. 4B. In this position, the block 74 has moved sufficiently upward that the key 82 is free to rotate in a clockwise direction.

Figure 4C:
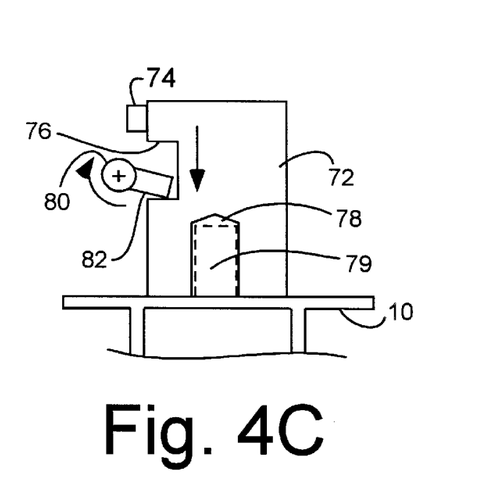
FIG. 4C is a front view of the reset mechanism resetting the seismic actuator to an open position.

When it is desired to reset the valve 50, for example after seismic activity has ceased, the lever 84 is manually rotated to thereby rotate the pin 80 and key 82 in a clockwise direction as shown in FIG. 4C. Upon such rotation, the key 82 will engage a lower surface of the keyhole 76 to thereby force the valve follower 72 and stopper 10 downward. When the valve follower 72 and stopper 10 have moved sufficiently downward, the locking ball 16 will once again enter into hollow cavity 20, at which time, gravity will pull the plunger 14 downward into its position shown in FIG. 2. In this position, the valve 50 is once again locked in its open position.

Figure 4D:
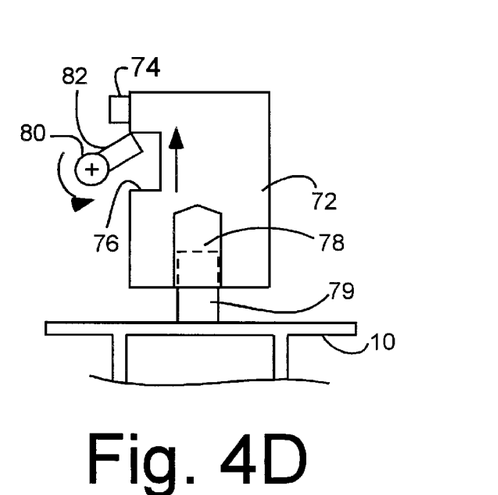
FIG. 4D is a front view of the reset mechanism resetting to a locked position.

In order to remove the key 82 from the keyhole 76, the lever 84 is rotated in a direction opposite to that for reseting the valve, as shown in FIG. 4D. Such rotation will lift the valve follower upward off of stopper 10 and partially off of positioning shaft 79. At some point during rotation of key 82 and upward movement of valve follower 72, the key 82 will clear the keyhole 76 and follower 72. At this point, the valve follower 72 will fall back down to its position shown in FIG. 4A, where the key 82 is again prevented from rotating by the block 74.

The only portion of the reset assembly 70 visible from the outside of the valve is preferably the reset lever 84. As described above, when the valve is in an open position, the pin 80, key 82, and lever 84 are prevented from rotating. However, when the valve is in a closed position, the pin 80, key 82, and lever 84 will rotate in one direction (to reset the valve) and then in the other direction (to reset the reset assembly). Thus, the lever 84 gives a positive indication of whether the valve is an open or closed state. If the lever 84 cannot be rotated, this indicates that the valve is in an open state allowing the flow of gas therethrough. On the other hand, if the lever 84 can be rotated, this indicates that the valve is in a closed state. The reset lever 84 may thereafter be rotated to reset the valve to an open position. As would be appreciated by those of skill in the art, when the valve is in the open state, it may be possible to rotate the lever 84 to a small degree in alternative embodiments. However, any such degree rotation would be less than the degree of rotation possible when the valve is in a closed state.

It is understood that the valve according to embodiments of the present invention may shut upon seismic activity of various magnitudes in alternative embodiments of the invention. The predetermined level of seismic activity that will trip the valve 50 may be adjusted by for example adjusting the relative positions of the locking ball 16 with respect to the detent 36 in plunger 14. The greater the distance between the relative positions, the larger will be the swing of the pendulum 12 necessary to align the locking ball 16 and detent 36 and trip the valve. Thus, for large distances between the relative positions of the locking ball and detent, relatively large seismic activity will be necessary to activate the valve, and visa versa. Additionally, the threshold level of seismic activity necessary to trip the valve may be varied by changing the diameter and/or spacing of flanges 29 and 31.

As will be appreciated by those of skill in the art, the physical expression of the concept of the present invention may be varied in alternative embodiments and still be within the scope of the present invention. For example, as opposed to the entire valve lying along a vertical axis, only the pendulum and pendulum base may be vertically oriented. The remainder of the valve may be provided at an angle of between 0 and 180° thereto. In such embodiments, the valve will operate as described above. Swinging of the pendulum in the base will cause the plunger to move along its axis until the detent 36 in the plunger allows the locking ball to disengage from the stopper, at which point the stopper will release along its axis (which may or may not be the same as the plunger) until it is received within a seat 40 to thereby prevent the flow of gas.

Figure 5:
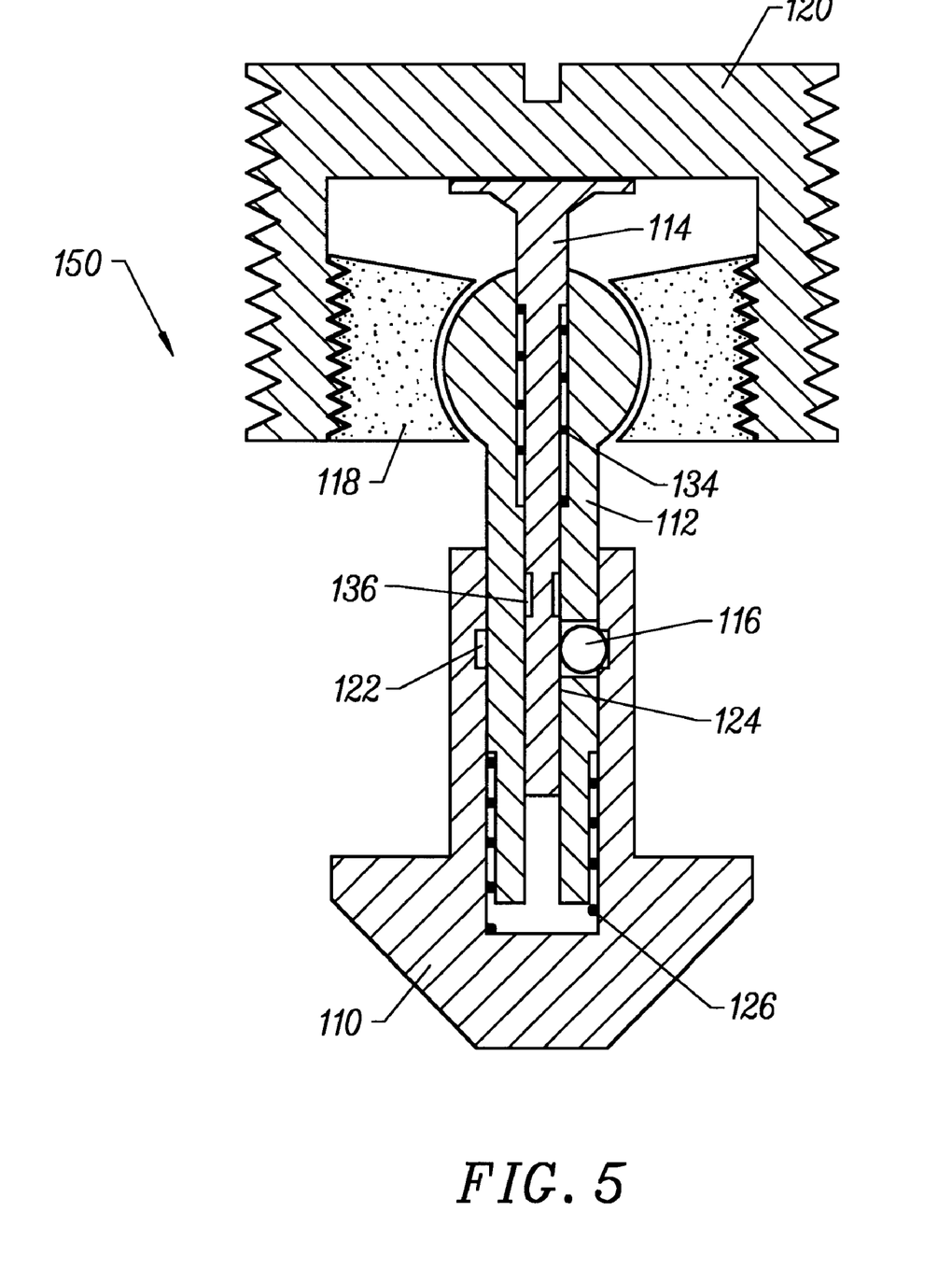
FIG. 5 is a front view of a seismic actuator according to an alternative embodiment of the present invention.

A further alternative embodiment of a seismic valve is shown in FIGS. 5–8. The figures show a valve 150 sitting within a pipe 140. The valve 150 includes a stopper 110, and a valve body comprised of a pendulum 112, a plunger 114, a locking ball 116, a pendulum base 118, and a carrier 120. When valve 150 is in an open state, the locking ball 116 resides within a hole 124 formed within the wall of pendulum 112. The diameter of locking ball 116 is slightly greater than the thickness of the wall of pendulum 112, so that a portion of the ball protrudes either into a hollow cavity defined by an inner wall surface of pendulum 112, or protrudes beyond an outer wall surface of pendulum 112. As shown in FIG. 5, the plunger 114 resides in the hollow cavity of pendulum 112, such that the plunger 114 contacts the locking ball 116 to insure that the ball 116 protrudes out of the hole 124 beyond the outer wall surface of pendulum 112 when the valve is in the open state.

The stopper 110 is locked on and surrounds the pendulum 112 when the valve is in an open state. A spring 126 is provided within a space between the stopper 110 and pendulum 112. When the valve is in an open state, the spring is compressed, with a first end supported against a first ledge formed in the plunger, and a second end supported against the stopper. Thus, the stopper is biased away from the valve body (i.e., downward with respect to the view shown in FIG. 5). The stopper 110 is, however, locked or held in position around the pendulum 112 by means of a circular detent 122 formed around the inner diameter of stopper 110. When the valve is in an open state, the detent 122 of stopper 110 engages the protruding portion of the locking ball 116, to thereby lock the stopper in position over the pendulum. As long as locking ball 116 is held within detent 122, the stopper 110 will remain in position around the pendulum 112 and the valve will remain in an open state.

Figure 6:
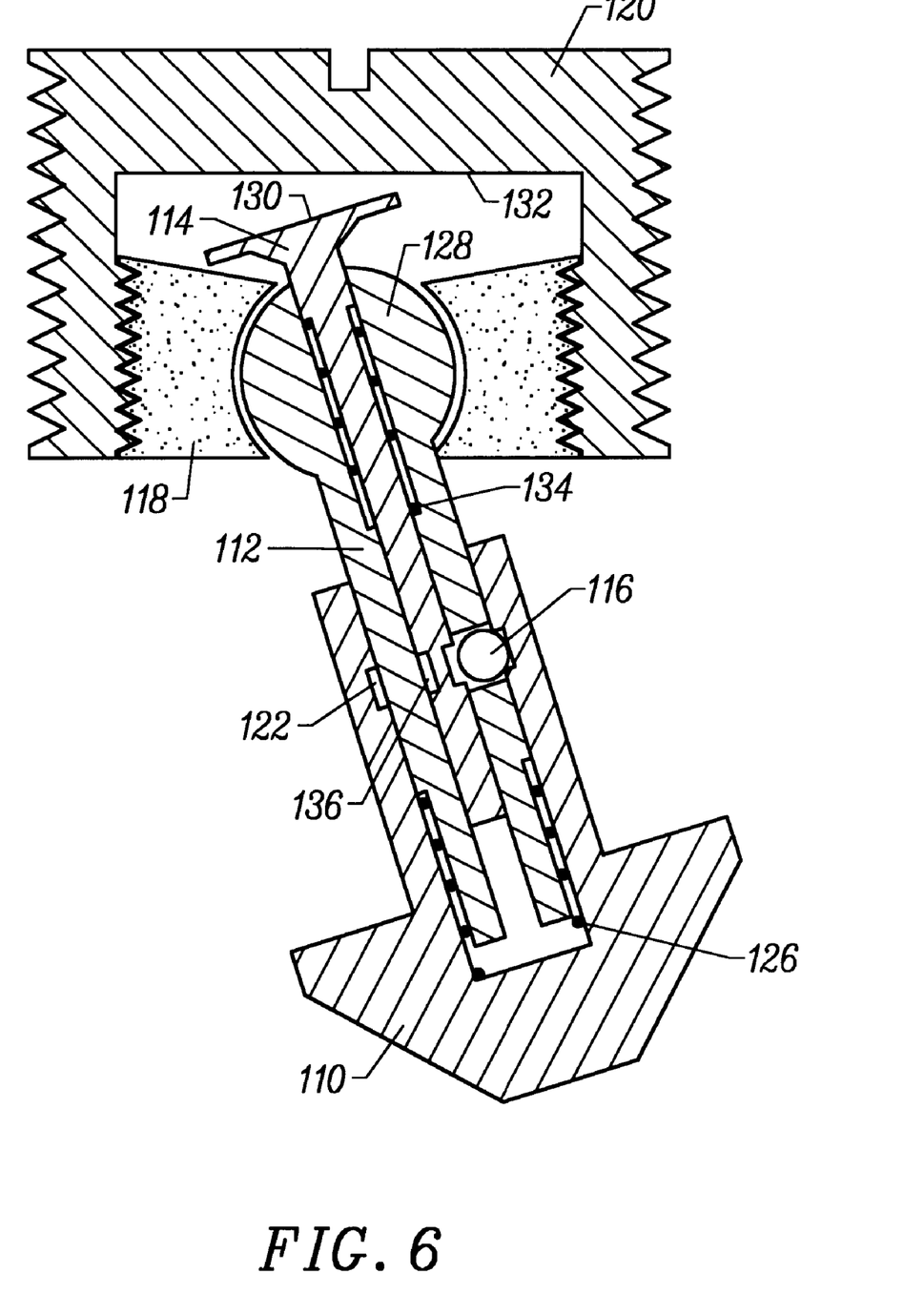
FIG. 6 is a cross-sectional side view of the actuator according to the present invention tilting upon seismic activity.
Figure 7:
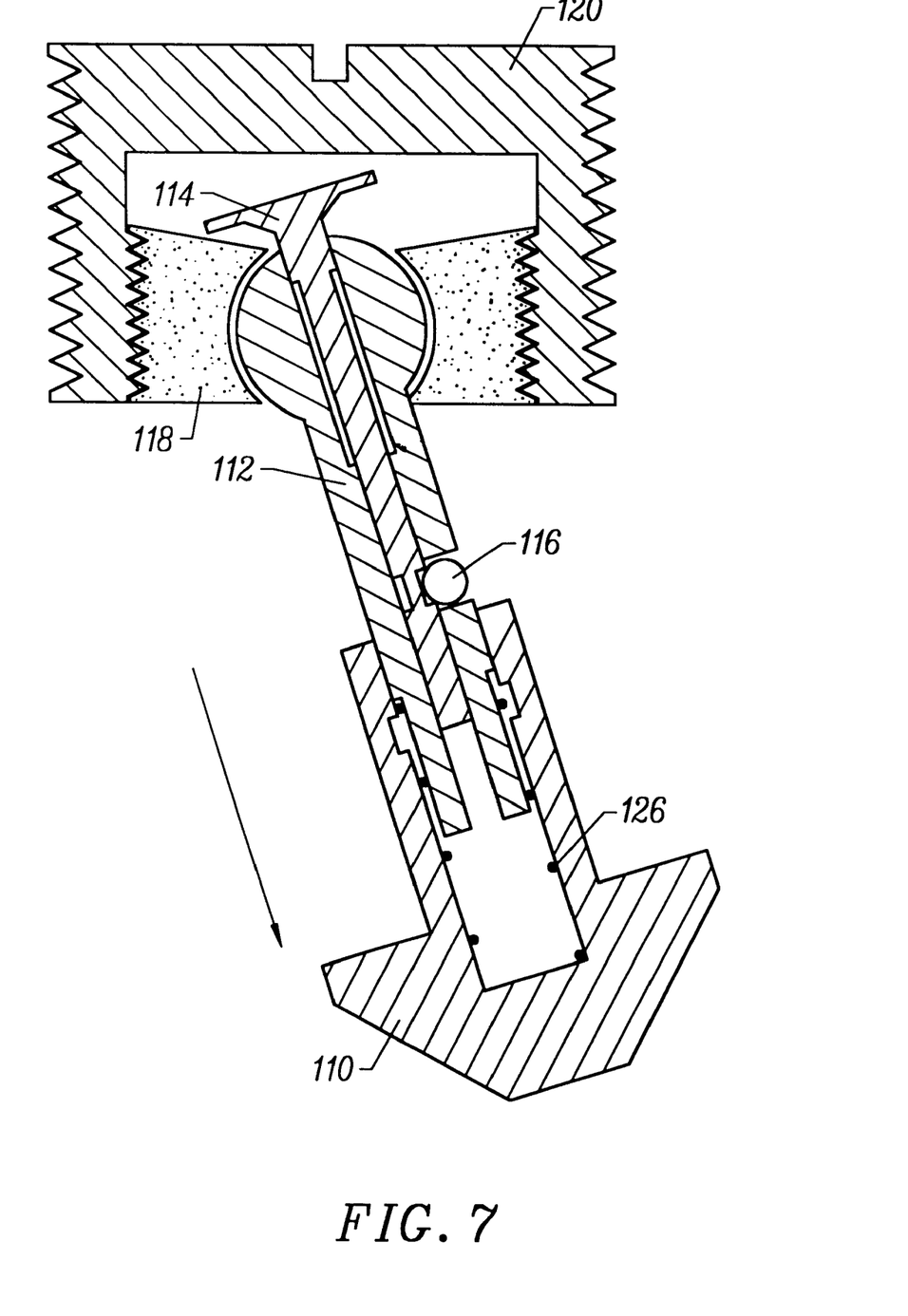
FIG. 7 is a cross-sectional side view of the actuator according to the present invention with the stopper released from the actuator to block gas flow upon tilting due to seismic activity.

Referring now to FIGS. 6 and 7, the pendulum 112 includes a ball portion 128 movably secured within a central portion of pendulum base 118. During an earthquake, seismic activity will exert forces on the valve 150 that cause the pendulum 112 and the components attached thereto (i.e., the plunger 114 and the locking ball 116) to swing within the pendulum base 118. Such swinging causes a central axis of the pendulum to be angled with respect to a central axis of the pendulum base 118 and carrier 120, which remain stationary relative to the pipe. The swinging of the pendulum and components attached thereto will occur when any component of the force due to the seismic activity acts on the pendulum in a plane perpendicular to a central axis through the middle of the valve 150.

The plunger 114 includes a top portion 130 which is biased against a roof 132 of the carrier 120. The plunger 114 is biased against the roof 132 by means of a spring 134 engaged between a ledge formed in the plunger 114 and a second ledge formed in the pendulum 112, in a space between the plunger 114 and the pendulum 112. In the absence of seismic activity, the spring 134 causes the top portion 130 to lie flat against the roof 132 to thereby maintain the pendulum 112 and components attached thereto generally concentric around the central axis through the pipe 140.

The plunger 114 includes a detent 136 around an outer circumference of the plunger. As shown in FIG. 5, the detent is formed along the length of the plunger such that, when the valve is an open state, the detent 136 is not aligned with the locking ball 116. However, as shown in FIG. 6, when the pendulum 112 swings within pendulum base 118 such that the top portion 130 is no longer flat against the roof 132, the plunger 114 is forced downward with respect to pendulum 112. Upon moving downward, the detent 136 will align with the hole 124 in pendulum 112, thereby allowing the locking ball 116 to move out of the detent 122 in the stopper 110 and into the detent 136 in the plunger 114. Once the locking ball 116 moves out of the detent 122 in the stopper 110, the stopper shoots away from the valve body (FIG. 7) and into a seat 138 (FIG. 8) circumferentially provided within the pipe 140, to thereby shut off gas flow through the pipe 140.

The valve 150 is reset as follows. In a preferred embodiment, the valve 150 is located at a right angle bend in pipe 140, and the carrier 120 lies in threaded engagement via threads 145 with threads (not shown) within pipe 140. At the right angle bend in the pipe 140, an upper surface 141 of the carrier 120 lies on an exterior surface of the pipe 140. The upper surface 141 of carrier preferably includes a groove 142 for receiving a screwdriver or similar device for rotating the carrier 120 with respect to the pipe. As would be appreciated by those skilled in the art, means other than groove 142 may be provided within the upper surface 141 of carrier 120 to allow the carrier 120 to be rotated. Upon rotating the carrier 120, the threads 145 cause the carrier 120 to move downward with respect to the view shown in FIG. 8. As the pendulum base 118 is engaged with the carrier 120, and as the pendulum 112 is mounted within pendulum base 118, the entire valve body moves downward as the carrier 120 rotates.

Figure 8:
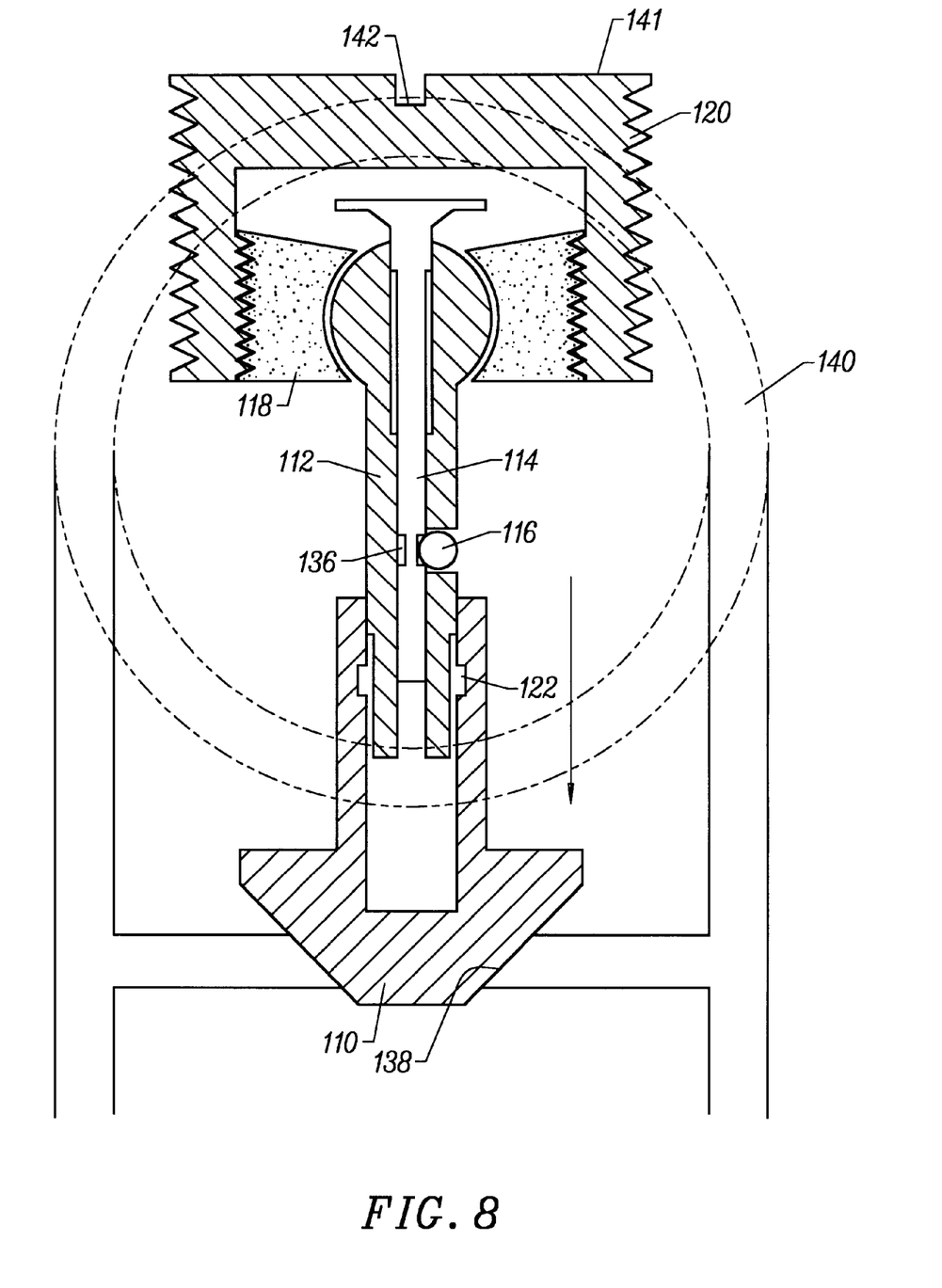
FIG. 8 is a side view of the actuator according to the present invention seated within a gas pipe in a closed state.

During the downward movement of the valve body, the stopper remains in a fixed unmoving position within the seat 138. At some point during the downward movement of the valve body relative to the stopper 110, the locking ball 116 will align with the detent 122 of the stopper 110. At this point, the locking ball 116 is forced out of the detent 136 and into the detent 122 of stopper 110 as a result of spring 134 pushing the plunger 114 upward with respect to the pendulum 112. The spring 134 forces the plunger 114 upward with respect to the pendulum 112 until the top portion 130 of the plunger 114 is once again flush against the roof 132. Once the plunger has moved upward with respect to the pendulum, the detent 136 in the plunger is once again not aligned with the locking ball 116, and the outer body of the plunger 114 presses against the locking ball 116 to lock the ball 116 in the detent 122 of the stopper.

Thereafter, rotation of the carrier 120 by a screwdriver engaged within groove 142 is reversed. This causes the valve body to move upward with respect to the view shown in FIG. 8. Moreover, as the stopper 110 is once again locked in position with respect to the pendulum 112 by virtue of the locking ball 116 being held within detent 122, the upward movement of the valve body will carry the stopper 110 upward as well. In this way, the stopper 110 is pulled out of the seat 138 and the valve is once again reset to an open state.

The seismic activity threshold at which valve 150 is tripped may be varied by raising or lowering the pendulum with respect to the plunger 114 by rotating the pendulum base 118 with respect to the carrier 120. Pendulum base 118 and carrier 120 are provided with threaded engaging surfaces 147 for this purpose. For example, if pendulum base 118 is rotated to move pendulum base 118 upward with respect to carrier 120, the pendulum 112 will move upward with pendulum base 118 by virtue of ball portion 128 being secured within the central portion of pendulum base 118. The plunger 114, however, being flush with the roof 132, will remain stationary with the result that the space between detent 136 and locking ball 116 will increase. Therefore, the pendulum 112 will have to swing to a relatively large extent to move the plunger 114 sufficiently downward relative to the pendulum 112 to align the detent 136 with the locking ball 116. Such relatively large movement of plunger 114 and swinging of pendulum 112 will occur only upon relatively large seismic activity.

Figure 9:
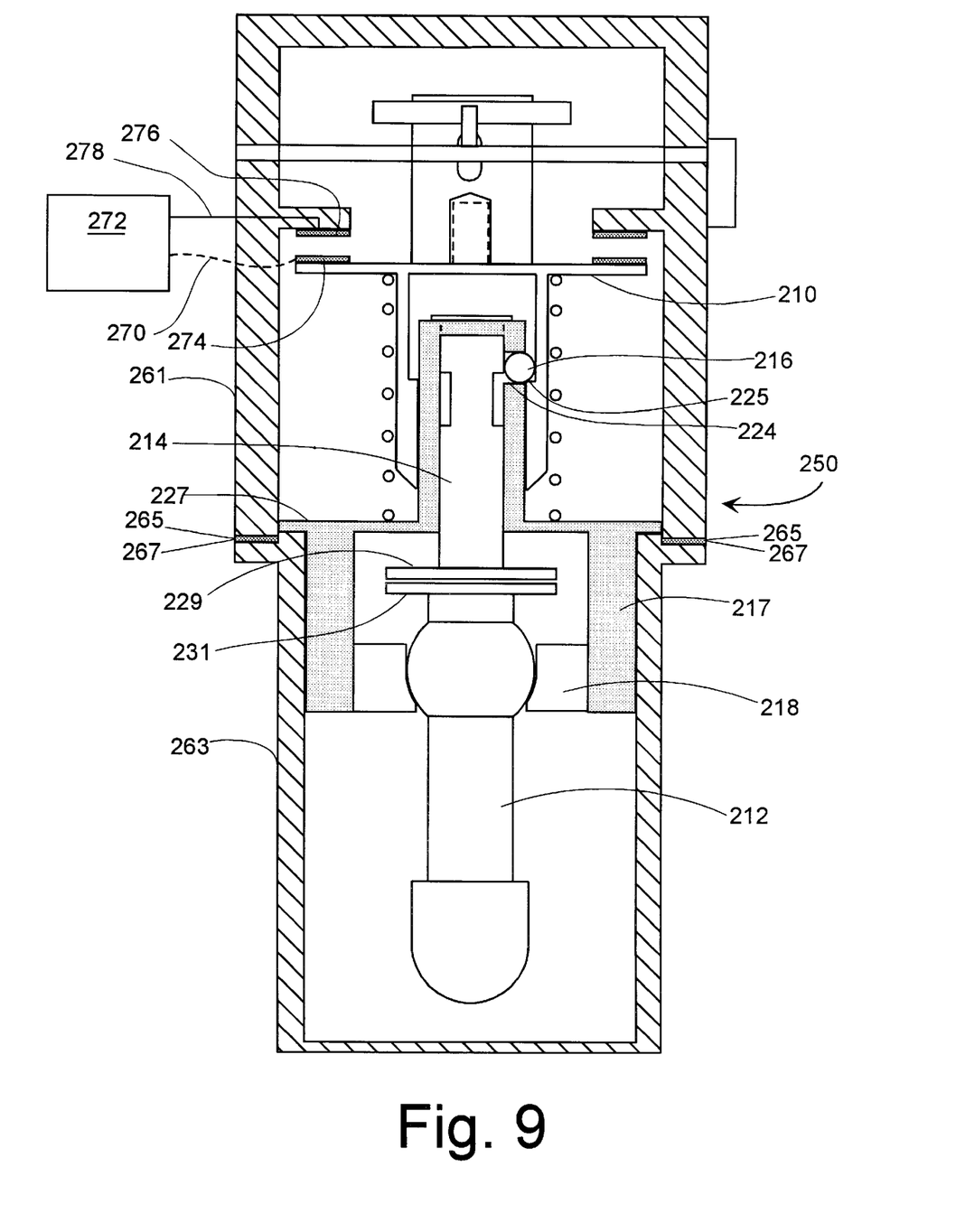
FIG. 9 is a front view of a seismic actuator according to a further embodiment of the present invention.

Up to this point, the seismic actuator according to the present invention has been described as a gas valve for shutting down the flow of gas through a gas line. However, in an alternative embodiment of the present invention shown in FIG. 9, the actuator according to the present invention may be used as part of an electrical switch for turning on or turning off an electrical circuit. The particular embodiment shown in FIG. 9 is capable of turning on an electrical circuit, such as an auxiliary power or lighting system. The embodiment includes the same components, and operates in the same manner, as the embodiment of the actuator described with reference to FIGS. 1–4d. Like parts to those of FIGS. 1–4d have been incremented by 200 in FIG. 9.

In particular, in response to seismic activity above a threshold level, a switching member 210 will separate from the actuator body. In this embodiment, the switching member may include an electrically conductive contact pad 274. A lead 270 forming part of an electrical circuit 272 may be affixed to the conductive portion of switching member 210. The lead is shown schematically in FIG. 9, and it is understood that the lead 270 may be thread through a portion of the valve and out through the valve housing to the electrical circuit. Upon seismic activity above the threshold level, the switch member may move into contact with a second conductive pad 276 also electrically connected to the circuit 272 by a lead 278 through the valve housing. Upon contact of the two conductive pads 274 and 276, the electrical circuit may be closed and current may flow therethrough. Those of skill in the art will appreciate that the seismic actuator according to the present invention may activate or deactivate electrical circuits in other ways.

In a still further embodiment (not shown), the seismic actuator according to the present invention may act as a mechanical switch. In such an embodiment, a weight or volume of fluid may be stored at first point representing a higher potential energy position with respect to a second point. Switching of the seismic actuator from an open to a closed state may initiate movement of the weight or volume of fluid from the first point to the second point. Upon such movement, the potential energy in the system may be used to perform certain activities, such as for example turning fly wheel. It is understood that the seismic actuator according to the present invention may be used to activate and/or change various other electrical and mechanical systems in further embodiments.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

I claim:

1. A seismic valve for controlling fluid flow through a pipe in the event of seismic activity, the valve allowing fluid flow when the valve is in an open state and the valve shutting off fluid flow when said valve is in a closed state, comprising:

a housing affixed to the pipe;

a stopper movable within said housing between a first position and a second position, said stopper allowing fluid flow through the pipe when in said first position, and said stopper blocking fluid flow through the pipe when in said second position;

means for biasing said stopper into said second position;

a locking means within said housing capable of engaging said stopper to maintain said stopper in said first position;

a plunger including a detent, said plunger capable of moving between a first location wherein said detent is not aligned with said locking means and wherein said plunger maintains said locking means in engagement with said stopper, and a second location wherein said detent is aligned with said locking means such that said locking means moves into said detent and does not engage said stopper;

a pendulum capable of occupying a first state and a second state, said pendulum capable of moving from said first state to said second state upon seismic activity, said pendulum moving said plunger to said second location when said pendulum is in said second state; and a reset mechanism, including:

a valve follower supported on said stopper within said housing and capable of vertical translation with respect to said stopper, said valve follower including a recessed portion defined in part by a bottom edge and a top edge, a reset pin extending though said housing and having a portion extending outside of said housing, said reset pin capable of being rotated, a reset key mounted to said reset pin adjacent to said valve follower, said reset key being incapable of engaging within said recessed portion when the valve is in the open state;

wherein rotation of said reset pin in a first direction when the valve is in the closed state rotates said reset key into engagement with said bottom edge of said recessed portion, said engagement exerting a force on said stopper through said valve follower, said force capable of moving said stopper from said second position to said first position.

2. A seismic valve for controlling fluid flow through a pipe in the event of seismic activity as recited in claim 1, wherein said plunger moves from said second location to said first location upon said stopper moving from said second position to said first position.

3. A seismic valve for controlling fluid flow through a pipe in the event of seismic activity as recited in claim 1, wherein rotation of said reset pin in a second direction opposite said first direction after engagement of said reset key with said bottom edge rotates said reset key into engagement with said top edge, said engagement capable of lifting said valve follower off of said stopper, lifting of said valve follower off of said stopper allowing said reset key to move clear of said top edge and recessed portion.

4. A seismic valve for controlling fluid flow through a pipe in the event of seismic activity as recited in claim 3, said valve follower moving back into engagement with said stopper upon said reset key clearing said top edge.

5. In a seismic valve for controlling fluid flow through a pipe in the event of seismic activity, the valve including a stopper moving between a first position where the stopper allows fluid to flow through the pipe and a second position where the stopper blocks fluid from flowing through the pipe, a reset mechanism for resetting the stopper from the second position to the first position, the reset mechanism comprising:

a housing affixed to the pipe;

a valve follower supported on the stopper within said housing and capable of vertical translation with respect to the stopper, said valve follower including a recessed portion defined in part by a bottom edge and a top edge;

a reset pin extending though said housing and having a portion extending outside of said housing, said reset pin capable of being rotated;

a reset key mounted to said reset pin adjacent to said valve follower, said reset key being incapable of engaging within said recessed portion when the valve is in the open state;

wherein rotation of said reset pin in a first direction when the valve is in the closed state rotates said reset key into engagement with said bottom edge of said recessed portion, said engagement exerting a force on the stopper through said valve follower, said force capable of moving the stopper from said second position to said first position.

6. In a seismic valve for controlling fluid flow through a pipe in the event of seismic activity, the valve including a stopper moving between a first position where the stopper allows fluid to flow through the pipe and a second position where the stopper blocks fluid from flowing through the pipe, a reset mechanism for resetting the stopper from the second position to the first position as recited in claim 5, wherein rotation of said reset pin in a second direction opposite said first direction after engagement of said reset key with said bottom edge rotates said reset key into engagement with said top edge, said engagement capable of lifting said valve follower off of the stopper, lifting of said valve follower off of the stopper allowing said reset key to move clear of said top edge and recessed portion.

7. In a seismic valve for controlling fluid flow through a pipe in the event of seismic activity, the valve including a stopper moving between a first position where the stopper allows fluid to flow through the pipe and a second position where the stopper blocks fluid from flowing through the pipe, a reset mechanism for resetting the stopper from the second position to the first position as recited in claim 5, said valve follower moving back into engagement with the stopper upon said reset key clearing said top edge.

* * * * *